US006165611A

United States Patent [19]

Hirano et al.

[11] Patent Number: 6,165,611

[45] **Date of Patent: *Dec. 26, 2000**

[54] THERMAL TRANSFER SHEET FOR PRINTING PRINTED MATTER WITH METALLIC LUSTER

[75] Inventors: Toshifusa Hirano; Shunichi Ebihara, both of Tokyo-to, Japan

[73] Assignee: Dai Nippon Printing Co., Ltd., Tokyo-to, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,684

[22] Filed: Jun. 10, 1997

[30] Foreign Application Priority Data

Jun. 10, 1996 [JP] Japan .................................. 08-168733
Jun. 28, 1996 [JP] Japan .................................. 08-186976

[51] Int. Cl.$^7$ ................................ B32B 5/14; B41M 5/00

[52] U.S. Cl. .......................... 428/344; 428/348; 428/349; 428/341; 428/457; 428/200; 428/209; 428/212; 428/913; 428/914

[58] Field of Search .................................... 428/195, 200, 428/201, 209, 212, 341, 344, 348, 349, 473.5, 474.4, 457, 458, 913, 914; 156/233

[56] References Cited

U.S. PATENT DOCUMENTS 4,868,049 9/1989 Nelson .................................... 428/328
4,892,602 1/1990 Oike et al. .............................. 156/233
4,902,364 2/1990 Parker et al. ........................... 156/233
5,300,169 4/1994 Tahara ..................................... 156/230
5,736,253 4/1998 Hinchcliffe et al. .................... 428/461

*Primary Examiner*—Marie Yamnitzky
*Attorney, Agent, or Firm*—Ladas & Parry

[57] ABSTRACT

A thermal transfer sheet for printing a printed matter having a metallic luster comprised of a substrate, a deposition anchor layer, a metal deposition layer and an adhesive layer. The deposition anchor layer, the metal deposition layer and the adhesive layer are formed in this order on one surface of the substrate. The deposition anchor layer contains a linear polymer having a glass transition temperature of not less than 130° C. by an amount of not less than 40 weight % of a total weight of the deposition anchor layer to thereby preventing the metal deposition layer from clouding due to high heat of a thermal head. The adhesive layer is formed of a mixture containing a wax and a thermoplastic resin and a composition ratio in amount of the thermoplastic resin to the wax is made smaller on a side to be contacted a transfer-receiving material than that on a side contacting the metal deposition layer along a direction of thickness of the adhesive layer to thereby provide a good appearance of the luster surface on the printed matter having an irregular surface.

9 Claims, 1 Drawing Sheet

THERMAL TRANSFER SHEET FOR PRINTING PRINTED MATTER WITH METALLIC LUSTER

BACKGROUND OF THE INVENTION

The present invention relates, in one aspect, to a thermal transfer sheet for printing letters, figures, patterns, etc. having metallic feeling such as metallic luster to a transfer-receiving material, and more particularly, to a thermal transfer sheet capable of providing metallic feeling without being influenced with high heat generated at a time of printing by a thermal printer. In another aspect, the present invention also relates to a thermal transfer sheet capable of providing metallic feeling without being influenced with a surface condition of a transfer-receiving material such as paper even in a case where images or the like are preliminarily printed on the transfer-receiving material and the printed surface has irregularity because of the presence of an printed ink layer or a case where the transfer-receiving material has flat smooth surface portion and non-flat smooth surface portion in combination.

In a prior art, there is known a hot stamping method, as a method of printing letters or figures having metallic luster, in which a transfer foil is heat pressed on the surface of the transfer-receiving material by using a stamp formed of such as metallic material provided with a protrusion having the same pattern as a design of a printed matter.

There is utilized, as such a transfer foil, a layered product formed by laminating a peeling (or peelable) layer, a deposition anchor layer, a metal deposition layer and an adhesive layer in this order on one surface of a substrate film having a thickness of about 9 to 25 μm. The adhesive layer side of the transfer foil, that is, most outer surface of the transfer foil, faces the surface of the transfer-receiving material such as paper, and the stamp heated to a temperature of about 100 to 130° C. is pressed against the transfer-receiving material from the substrate film side of the transfer foil for several seconds to thereby transfer a desired image on the surface of the transfer-receiving material.

However, according to such hot stamping method, it is necessary to produce the metal stamp in accordance with every image to be printed, and therefore, much cost is involved even in a case of less printed materials required, providing an economical problem. Furthermore, in order to carry out a halftone recording, it is necessary to make dots and the like on the surface of the stamp with high precision, and there is required much time and labour and also caused a problem that it is difficult to record fine halftone images.

In recent years, there has been provided a thermal transfer recording method using a thermal head and a thermal transfer ribbon. This thermal transfer recording method uses a heating element such as thermal head in place of a stamp utilized in the hot stamping method mentioned above, and this method is suitable for obtaining a small amount of the printed matters. Furthermore, according to the thermal transfer recording method, the halftone image can be easily recorded through a so-called area gradation method in which concentration gradation is expressed by controlling the area ratio of a dyed or colored portion with respect to a printed area, for example, by changing the sizes of dots to be applied respective portions. For this reason, it is desired to print letters or figures having metallic luster through such thermal transfer recording method.

For example, Japanese Patent Laid-open (KOKAI) Publication No. SHO 63-30288 or No. HEI 1-257082 discloses a technology such that a thermal transfer process is performed by the thermal head with the use of an metallic foil obtained through improvement of that used for the conventional hot stamping method. In these publications, there is disclosed a transfer foil improved by applying a thin substrate film to the conventional transfer foil for hot stamping method which is formed by laminating the peeling layer, the deposition anchor layer, the metal deposition layer and the adhesive layer in this order on one surface of the substrate film, or also disclosed a transfer foil improved by making the deposition anchor layer to serve a function as peeling layer.

However, in such conventional transfer foil for the hot stamping method, the deposition anchor layer is formed of a resin material such as acrylic group resin, urethane resin, cellulose resin or the like, and the above described transfer foil improved for the thermal transfer process using the thermal head also has the similar deposition anchor layer. For this reason, when such conventional transfer foil is used for the transfer process using the thermal head, the metal deposition layer loses its metallic luster, i.e. is clouded, at the time of printing and it is impossible to obtain a recorded material having a mirror-like metallic luster appearance.

Such loss of the metallic luster of the metal deposition layer is caused by a difference in processes at a time of thermal energy application between the thermal transfer process using the thermal head and the hot stamping process. That is, in the hot stamping process, a recorded material is obtained by pressing the stamp heated to a temperature of about 100 to 130° C. for several seconds from the back surface side of the substrate film having a thickness of about 9 to 25 μm. On the other hand, in the thermal transfer process using the thermal head, a recorded material is obtained by pressing the thermal head from the back surface side of the substrate film having a thickness of about 3 to 6 μm, and then the temperature of the thermal head surface is increased to about 300° C. in several to ten-several m.sec. Accordingly, in the process of using the thermal head, the deposition anchor layer formed on the substrate film is heated to a temperature at least about 130 to 200° C. even in consideration of thermal energy loss. At this time, when the deposition anchor layer is formed of a conventional resin material as mentioned above, the deposition anchor layer is heated to a temperature more than a glass transition temperature, and because of pressure further applied, elastic deformation or plastic deformation will be caused. In such case, the metal deposition layer formed on the deposition anchor layer as a mirror-like surface cannot follow up the deformed deposition anchor layer, generating a number of fine cracks in the metal deposition layer. As this result, in a printed material formed through the thermal transfer process to the transfer-receiving material, a number of fine cracks will be caused on the metal deposition layer and the surface thereof will be clouded.

The transfer foils mentioned above include one prepared by using a two liquid setting (curing) type or one liquid setting type resin as a material for the deposition anchor layer, applying such resin on the substrate film surface and then carrying out the thermosetting process to thereby increase the glass transition temperature of the deposition anchor layer. In the case of using the two liquid or one liquid setting type resin, although there causes no problem of the loss of the metallic luster of the metal deposition layer, it is not suitable for the application to the coating on the thin substrate film usable for the thermal transfer process using the thermal head because of short pot life at the coating time or setting condition of high temperature and long time, thus providing a problem.

Furthermore, for the conventional transfer foil for the hot stamping process, an adhesive layer is formed of a mixture of a wax group material and an adhesive resin or formed of a resin capable of increasing a cohesive strength of the adhesive layer, and even for the transfer foil improved for the thermal transfer process using the thermal head, an adhesive layer similar to that mentioned above is used.

Incidentally, in a case where an image having luster is formed on a paper having no flat smooth surface, i.e. irregular surface, it is necessary for the conventional adhesive layer of the structure mentioned above to include a wax component having low melt viscosity so as to infiltrate into recessed portions of the transfer-receiving material surface. However, when an adhesive layer having much wax component is used, the adhesive layer itself loses the cohesive strength, so that the metal deposition layer is easily peeled and removed because of cohesive failure of the adhesive layer after the transferring to the transfer-receiving surface. In such case, it may be possible to improve the adhesive property between the metal deposition layer and the transfer-receiving material by making thin the thickness of the adhesive layer, but it becomes impossible to absorb the irregularity of the transfer-receiving material by the adhesive layer, and accordingly, level difference may appear on the transfer-receiving material surface or cracks may be caused thereon, losing the luster. Therefore, if it is attempted to form an image having good luster on the paper having no flat smooth surface, an excellent luster appearance cannot be expected.

On the other hand, in a case where an image having luster is formed on a transfer-receiving material such as a film which has relatively flat smooth surface and into which the adhesive layer material less infiltrates, an adhesive effect due to the infiltrating force of the adhesive layer material is hardly expected. For this reason, in order to well maintain the fixing property of the printed matter, it is necessary to increase the resin component in the adhesive layer and to increase the cohesive strength of an ink. However, in the case of increased resin component, strength of the adhesive layer is excessively increased to lower the printing sensitivity and the resolution. This problem may be somewhat improved by making high the sensitivity of the resin component, i.e. making low the molecular weight, or making low the glass transition temperature (Tg). However, in such treatment, sheet blocking may be easily caused at a time when the thermal transfer sheet is fed in roll form.

Furthermore, in a case when a transfer-receiving material having a highly flat smooth surface is used, the printing sensitivity, the resolution and the fixing property of the metal deposition layer can be extremely improved by making thin the thickness of the adhesive layer. However, in a case when a transfer-receiving material on which another print has already been formed, the surface of the transfer-receiving material provides irregularity even if the transfer-receiving material has itself a flat smooth surface and, hence, an adverse effect is given to the luster of the metal deposition layer as like as in the case of the transfer-receiving material having no flat smooth surface. Particularly, in recent years, since commercial packing papers and commercial labels are formed with many designs, there are many cases where images having metallic luster are further formed in an overlapped manner to coat papers, plastic films, synthetic papers or the like on which printed images have already been formed. Furthermore, the fixing property of the printed matter can be improved by the strength of the adhesive layer containing increased resin component. However, also in such case, the material forming the adhesive layer does not infiltrate in the portions having difference in level at a boundary portion between the printed portion and the non-printed portion, so that such portion provides further worse adhesive property.

SUMMARY OF THE INVENTION

A primary object of the present invention is to substantially eliminate defects, drawbacks or problems encountered in the prior art described above and to provide a thermal transfer sheet capable of printing letters or figures having metal feeing such as metallic luster without being influenced with high temperature caused at a time of carrying out printing process by using a thermal printer.

Another object of the present invention is to provide a thermal transfer sheet capable of printing images providing no irregular appearance by absorbing the irregularity of a transfer-receiving material even in a case where images having metallic feeling such as metallic luster are printed on the transfer-receiving material having an irregular surface condition, and further providing an improved fixing property, resolution of images and improved preservation condition thereof with no blocking caused.

These and other objects can be achieved according to the present invention by providing, in one aspect, a thermal transfer sheet for printing a printed matter having a metallic luster comprising a substrate, a deposition anchor layer, a metal deposition layer and an adhesive layer; said deposition anchor layer, said metal deposition layer and said adhesive layer being disposed in this order on one surface of said substrate, and said deposition anchor layer containing a linear polymer having a glass transition temperature of not less than 130° C. by an amount of not less than 40 weight % with respect to a total weight of said deposition anchor layer.

In the above structure, there is preferably used, as the linear polymer, at least one kind of polymers selected from polyimide group and a derivative thereof, and more preferably used at least one kind of polyimide derivatives selected from polyamideimide polyamidimide and a modified product thereof.

According to this one aspect of the thermal transfer sheet of the present invention mentioned above, the thermal sheet having the deposition anchor layer having high heat resisting property can be obtained and the clouding, i.e. loss of metallic luster, of the metal deposition layer after the printing can be prevented. Moreover, in the case where the deposition anchor layer is formed with the linear polymer mentioned above, it can be formed only by applying the linear polymer solution on the substrate and then drying the same, so that it is not necessary to specifically perform any heating process after the coating, thus being superior in productivity.

In the second aspect of the present invention, there is provided a thermal transfer sheet for printing a printed matter having a metallic luster comprising a substrate, a deposition anchor layer, a metal deposition layer and an adhesive layer; said deposition anchor layer, said metal deposition layer and said adhesive layer being disposed in this order on one surface of said substrate, said adhesive layer being formed of a mixture comprising a wax and a thermoplastic resin, and a composition ratio in amount of said thermoplastic resin to said wax being made smaller on a side contacting a transfer-receiving material than that on a side contacting the metal deposition layer along a direction of thickness of said adhesive layer.

In this second aspect, it is preferred that a total amount of the thermoplastic resin in the adhesive layer is in a range of 10 to 60 weight % with respect to a total weight of the adhesive layer. In another preferred example of this second aspect, the adhesive layer contains, as the thermoplastic resin, at least one kind of ethylene group copolymers. The adhesive layer may have a multi-layer structure having at least two adhesive layer components formed of different adhesive materials.

According to this second aspect of the present invention mentioned above, the adhesive layer has the portion on the transfer-receiving material side containing relatively much wax component and providing high permeability to the transfer-receiving material, so that even if the transfer-receiving material has an irregular surface, such irregular surface can be embedded, whereby images having improved metallic luster and less difference in level can be printed, thus being superior in an appearance. Furthermore, since the composition ratio of the thermoplastic resin of the adhesive layer is made larger towards the metal deposition layer side along the thickness direction thereof, the cohesive strength of the adhesive layer after the printing can be properly maintained and images having high resolution and fixing ability can be printed. Still furthermore, the thermal transfer sheet for forming images having superior resolution, fixing performance and metallic luster feeling can be provided by controlling the resin composition ratio in the entire adhesive layer and using the ethylene group copolymer as the resin component which has high compatibility to the wax component.

The nature and further characteristic features of the present invention can be made further clear from the description made with reference to the accompanying drawings by way of preferred embodiments.

BRIEF DESCRIPTION OF THE DRAWING

In the accompanying drawing, a single

DESCRIPTION OF THE PREFERRED EMBODIMENTS

Figure 1:
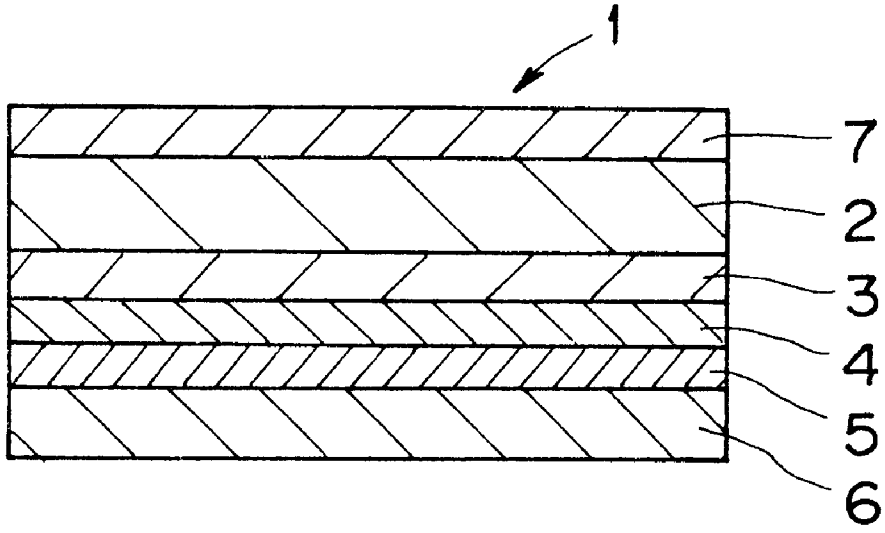
FIG. 1 shows a sectional view of a preferred embodiment of a thermal transfer sheet according to the present invention.

Thermal transfer sheets for printing printed matters having metallic luster will be described hereunder with reference to the accompanying drawings.

FIG. 1 is an vertical section of a thermal transfer sheet according to one embodiment of the first aspect of the present invention. Referring to FIG. 1, a thermal transfer sheet 1 includes a substrate 2 having a back surface on which a back surface layer 7 is formed. The substrate 2 also has a front surface on which a peeling (peelable) layer 3, a deposition anchor layer 4, a metal deposition layer 5 and an adhesive layer 6 are formed in a laminated structure in this order. The back surface layer 7 and the peeling layer 3 may be eliminated as occasion demands. Usually, the thermal transfer sheet according to the present invention is used as a thermal transfer ribbon having a continuous belt shape, but it may be also used as a unit sheet form.

The respective layers constituting the thermal transfer sheet of the first aspect according to the present invention will be described in detail hereunder.

First, the substrate material 2 is formed of a material having a heat resistance against the heating of a thermal head at a thermal transfer recording time, a desired heat conductivity and a proper mechanical strength, and the material is not limited to a specific one if the material has such properties and a known material conventionally used as a general thermal transfer sheet may be used. The material include, for example, a plastic film formed of polyester, polypropylene, polystyrene, cellophane, cellulose acetate, polycarbonate, polyvinyl chloride, polyvinylidene chloride or polyimide; a paper such as condenser paper or paraffin paper; a non woven fabric; or a compound film of these materials.

The thickness of the substrate 2 is properly determined in consideration of its mechanical strength, heat conductivity or the like, and in usual, the thickness is of about 2 to 25 μm. For example, in the case where the substrate 2 is formed of a polyethylene terephthalate film, the thickness thereof is usually of 2 to 8 μm, and preferably of 3 to 6 μm.

As shown in FIG. 1, it is preferred to form the back surface layer 7 having heat resisting property on the back surface of the substrate 2 for preventing the thermal fusion to the thermal head, and in addition, it is also preferred for the back surface layer 7 to have a lubricating function for providing an improved lubricating ability.

The back surface layer 7 is formed of, in order to apply the heat resisting property, a known thermosetting resin such as melamine resin, or a known thermoplastic resin such as silicone resin or fluororesin, and in order to apply the lubricating ability, an additive such as filler, lubricant, anti-static agent, etc. may be added. It is sufficient for the back surface layer to have a thickness suitable for applying a fusion preventing function and a lubricating function, and in usual, the thickness of the back surface layer is of about 0.1 to 3 μm.

The peeling layer 3 is a layer adapted to easily separate the metal deposition layer from the substrate. The peeling layer 3 may be composed of a layer which is peeled from the boundary surface between it and the substrate and then transferred to the transfer-receiving material together with the metal deposition layer and the deposition anchor layer. Otherwise, the peeling layer 3 may be also composed of a layer which is subjected to a cohesive failure and is separated at a portion near the intermediate portion in the thickness direction thereof and one part of the separated peeling layer is transferred to the transfer-receiving material. The former peeling layer which is peeled from the boundary portion to the substrate and the latter peeling layer which is subjected to the cohesive failure form the most outer, i.e. front, surface of the recorded material after the transfer. It is desired that the partially transferred peeling layer or the entirely transferred peeling layer is formed of a material having a low cohesive strength at the recording time so as to provide the improved layer cut-off performance at the printing time. Furthermore, the peeling layer may be formed so as not to be transferred at all and so as to be easily peeled from the boundary surface between it and the deposition anchor layer.

The peeling layer 3 may be formed of a wax such as carnauba wax, paraffin wax, micro-crystalline wax, ester wax, Fischer-Tropsch wax, various kinds of low molecular weight polyethylene, Japan tallow, bee wax, spermaceti wax, insect wax, wool wax, shellac wax, candelilla wax, petrolatum, partially denatured wax, fatty acid ester, fatty acid amide, and so on.

Resins other than the above waxes, which have proper peelable property with respect to the substrate, may be used, and furthermore, mixtures of these waxes and resins may be also used.

As such resins, there may be used, for example, a rubber material such as polyisoprene rubber, styrene butadiene rubber or butadiene acrylonitrile rubber; acrylic acid ester group resins; polyvinyl ether group resins; polyvinyl acetate group resins; vinyl chloride-vinyl acetate copolymer group resins; polystyrene group resins; polyester group resins; polyamide group resins; polyimide group resins, polyolefin chloride group resins, or polycarbonate or polyvinyl butyral group resins.

The peeling layer 3 generally has a thickness of 0.1 to 10 $g/m^2$ in coated amount. In the case of less than 0.1 $g/m^2$, the peeling layer 3 attains no function as a peelable layer. In the case of more than 10 $g/m^2$, an ability that a transferred layer can be clearly cut off at a desire portion at the printing time, i.e., layer cut-off ability or performance, is degraded, and particularly, halftone recording is not preferably performed and layer preservation performance is lowered, being not usable.

The deposition anchor layer 4 will constitute a bed at the metal deposition process and protect the substrate and so on from heating in the deposition process, and to realize the metallic luster appearance. Moreover, the deposition anchor layer 4 is transferred to the transfer-receiving material together with the metal deposition layer, and after the transfer printing operation, it constitutes an upper layer closely adhering to the metal deposition layer as one constituting element of a recorded material and also attains a function as a protector layer for improving the mechanical and chemical strengths of the metal deposition layer against scratch or corrosion. Accordingly, it is required for the deposition anchor layer to provide a transparency capable of visually observing the metallic luster of the metal deposition layer.

In the first aspect of the present invention, the deposition anchor layer 4 is a characteristic layer and has a heat resisting property so as not to be deformed even if it is exposed under a high temperature condition, which is not attained by the conventional hot stamping method, and therefore, the loss of the metallic luster of the metal deposition layer is not caused. Furthermore, since the deposition anchor layer of the present aspect is formed of a linear polymer but not a crosslinking polymer, it is not necessary to carry out any hardening treatment such as the heating process, and the deposition anchor layer can be easily formed only by coating and drying a solution.

It is necessary for the material forming the heat resisting deposition anchor layer to have a glass transition temperature higher than the heating temperature of the thermal head. In a case where the printing operation is performed by using a known thermal head, the deposition layer will be generally heated to about 130 to 200° C., and accordingly, it is necessary, for a material for the deposition anchor layer suitable for the thermal transfer treatment using the thermal head, to have a glass transition temperature of at least 130° C. or more than 130° C. Furthermore, in consideration of such a case that more energy may be required for the printing of a portion having deep image concentration, it is preferable that the glass transition temperature is 200° C. or more than 200° C.

The term "glass transition temperature" means, as to a polymer, a temperature at which a micro-Brownian motion in a solid state of polymer chain segment is frozen or released. Even in a case where the temperature of the deposition anchor layer heated by the thermal head does not reach the melting point, if this temperature exceeds the glass transition temperature, the micro-Brownian motion of the polymer chain segment is released, so that the deposition anchor layer pressed between the thermal head and a platen roller will be easily deformed by this pressing force. As this result, the metal deposition layer closely contacting the deposition anchor layer does not follow up in shape such deformation of the deposition anchor layer and fine cracks may be caused, which are visually observed as cloudiness. Accordingly, it is important to increase the glass transition temperature of the polymer constituting the deposition anchor layer to a temperature more than a heating temperature of a heating element such as the thermal head.

There will be listed up, as linear polymers which have glass transition temperatures of not less than 130° C. or not less than 200° C., polymers such as polyimide group; polyamideimide group; polyether ketone group such as polyether-etherketone (PEEK) or polyether ketone (PEK); polyether sulfone; polysulfone; polyarylate; or polyphenylene oxide, which may be used as a sole or mixture material.

Furthermore, it is desired for the linear polymer mentioned above usable for the present invention to be dissolved by a solvent so as to easily form the deposition anchor layer by applying a coating liquid of the linear polymer through a known coating method. Further, the glass transition temperature of the polymer is a physical property basically having no relation to the molecular weight and the solvent dissolving property thereof is a physical property largely depending on the molecular weight, so that the solvent dissolving property can be adjusted by selecting a suitable molecular weight after selecting a basic polymer structure by pointing weight on the glass transition temperature. Otherwise, the main chain structure or end structure of the linear polymer resin may be modified or denatured so that the polymer can be dissolved in a solvent. In a case where the resin is modified, it is desired that the resin can be dissolved in a solvent having a low boiling point. As such a solvent capable of dissolving the polymer resin, for example, N-methyl pyrolidone (NMP) or dimethyl formamide (DMF) will be used. Further, in a case where the linear polymer resin is effected with a proper modifying treatment, a known solvent such as toluene, methylethylketone, ethyl acetate, isopropyl alcohol, ethanol or methanol. These solvents may be used solely or in mixture.

In the linear polymers mentioned above, the polyimide and its derivatives are preferable linear polymers. Particularly, polyamideimide which is one of polyimide derivative and its modified product which is obtained by modifying polyamideimide so as to permit the use of the low boiling point solvent is usable.

It is to be noted that, although, the deposition anchor layer may be formed solely of the linear polymer mentioned above, it may be used in combination of another known thermoplastic resin. However, in such combination, it is desired that the linear polymer is contained at 40 weight % or more than 40 weight % with respect to the total weight of the deposition anchor layer. In the case of less 40 weight % thereof, the heat resisting property of the deposition anchor layer is lowered and it becomes deformable by the heating of the thermal head. As a result, fine cracks may be likely caused to the metal deposition layer during the transfer process and the printed matter may be suffered from the loss of metallic luster.

The thermoplastic resin having a glass transition temperature of less than 130° C. but being usable in combination with the linear polymer includes, for example, acrylic group resin such as polymethylmethacrylate or polyacrylamide; polystyrene group resin such as polystyrene; polyester group resin; vinyl group resin such as polyvinyl chloride or polyvinyl acetate; polyether group resin such as polyoxymethylene or polyphenyleneoxide; polyvinyl butyral resin; or cellulose such as nitrocellulose or ethylcellulose.

The deposition anchor layer usually has a thickness of 0.1 to 20 $g/m^2$ in coated amount in order to achieve the function as a bed layer and the protective layer for the metal deposition layer. In the case of less than 0.1 $g/m^2$, it does not attain a function as the deposition anchor layer, and in the case of more than 20 $g/m^2$, the layer will not be easily cut off at the printing time and such deposition anchor layer is not suitable for the halftone recording.

Any known dye, pigment or another coloring agent having cyan, magenta, yellow, black or another color may be mixed with the deposition. anchor layer forming material for the purpose of coloring the metal deposition layer formed of such as aluminum.

In the case where the deposition anchor layer is formed, as mentioned hereinbefore, so as to also have the function as the peelable layer, the location of the independent peeling layer 3 may be eliminated. In this case, a releasing agent such as silicone group resin may be added to the polymer mentioned above as the material for the deposition anchor layer.

The metal deposition layer 5 is a metallic thin film layer formed through a metallizing method, such as the vacuum deposition process, the spattering process or the like, in which metal such as aluminum, zinc, tin, chrome, gold or silver, or alloy such as brass is metallized under vacuum condition. In order to provide a desired metallic luster to the metal deposition layer, it is sufficient for it to have a thickness of, in usual, 100 to 1000 Å, and preferably 200 to 600 Å. In the case of small thickness of the metal deposition layer, a visual ray is not reflected to the extent that the metallic luster can be observed, and on the other hand, in the case of large thickness thereof, the layer will not be easily cut off at the printing time and such metal deposition layer is not suitable for the halftone recording, being not economical.

The adhesive layer 6 is formed of wax or thermoplastic resin solely or in mixture thereof. There will be used as such known wax, for example, carnauba wax, paraffin wax, micro-crystalline wax, ester wax, Fischer-Tropsch wax, various kinds of low molecular weight polyethylene, Japan tallow, bee wax, spermaceti wax, insect wax, wool wax, shellac wax, candellia wax, petrolatum, partially denatured wax, fatty acid ester, fatty acid amide, and so on.

Furthermore, a resin having good compatibility with the wax and good adhesive property to the metal deposition layer will be used as the thermoplastic resin for forming the adhesive layer, and according to the use of such thermoplastic resin, the properly high cohesive strength can be obtained for the entire adhesive layer after the printing of the image and the high fixing ability can be realized.

As the thermoplastic resin, ethylene group copolymer formed by polymerization of ethylene and another polymerization monomer will be preferably used. The ethylene group copolymer is good in the compatibility to wax and the adherence ability to the metal deposition layer. As the monomer to be copolymerized with the ethylene, there will be listed up, for example, vinyl acetate, acrylic acid, methacrylic acid, acrylic acid ester, or methacrylic acid ester. Accordingly, as a concrete example of an ethylene group copolymer, there will be used, for example, ethylene-vinyl acetate copolymer, ethylene-acrylic acid copolymer, ethylene-methacrylic acid copolymer, ethylene-methylacrylate copolymer, ethylene-ethylacrylate copolymer, ethylene-methylmethacrylate copolymer, ethylene-ethylmethacrylate copolymer, or the like. Further, a polyphyletic copolymer formed by copolymerizing the ethylene and two or more than two kinds of monomers may be used as a thermoplastic resin. The copolymer may be used solely or in combination. Still furthermore, a mixture of a plurality of copolymers, which are composed of the same kind of copolymerization monomers but both or one of the copolymerization ratios and molecular weights thereof are different from each other, may be used.

For the copolymerization ratio of the above ethylene group copolymer, it is preferable that the ethylene component is of 50 to 90% (in the case of total weight of the copolymer: 100) for achieving balance of fixing ability and anti-blocking property.

It is preferred that the above ethylene group copolymer has a weight-average molecular weight (Mw) in a range of 1000 to 100000. When a plurality of copolymers are used in mixture, it is desired that the respective copolymers have the molecular weights in the above range. In the case of less than 1000 of weight-average molecular weight, the resin will be liable to be fluidized in a normal temperature, i.e. room temperature, and in such case, a tack feeling will be caused to the adhesive layer, degrading the preservation performance. On the other hand, in the case of more than 100000 of weight-average molecular weight, the cohesive strength will become excessively strong to make worse the layer cut-off property at the printing time, lower the resolution, and particularly, an inconvenience will occur at the time of the halftone recording.

Further, as the thermoplastic resin used for the adhesive layer other than the above-mentioned ethylene group copolymers, another resin known as an adhesive layer for another thermal transfer material may be used in combination. For example, there will be listed up: polyethylene resin; polypropylene resin; polyvinyl acetate; polyester resin; polyurethane resin; styrene group resin; acrylic group resin; polyamide group resin; polyvinyl alcohol; polyvinyl acetate; petroleum resin; phnol resin; maleic resin; synthetic rubber such as polyisoprene rubber, styrene-butadiene rubber, butadiene-acrylonitrile rubber; or elastomer group such as natural rubber. These resins may be selected and used in combination as occasion demands in consideration of the kinds of surface materials of the transfer-receiving material.

When the material for the adhesive layer, particularly, the wax and the thermoplastic resin such as ethylene group copolymer exists in fine particle states in the adhesive layer, the cohesive strength at the thermal transfer process can be suppressed, thereby improving the layer cut-off ability, and performing the recording process with high resolution and high sensitivity. In order that the adhesive layer contains these materials in the fine particle states, for example, a dispersion or emulsion of these particles is applied on the metal deposition layer and then dried at a temperature below the melting point or softening point of the particles. It is to be noted that the fine particle state mentioned herein does not merely mean that particles, each having spherical shape or other shape, are independently floated, and means that substantially spherical independent fine particles are loosely combined with each other to an extent to be separated from each other to original independent particles at a time when an external force is applied, and their aggregates are floated while their shapes are being deformed by a proper heat. In the above, the latter meaning will be major.

When the wax and the thermoplastic resin are contained in fine particles, it is preferred that each of fine wax particles and each of fine thermoplastic resin particles have an average particle diameter of 10 $\mu$m or less than 10 $\mu$m. In the use of more than 10 $\mu$m, the printing sensitivity may be made worse or the layer preservation performance of the adhesive layer will be extremely damaged.

The required thickness of the adhesive layer is different in accordance with the surface shape or the surface condition of the transfer-receiving material. However, it is better to make possibly thin in view of the printing sensitivity, fixing ability of the printed image, and the resolution performance as far as the metallic luster and the layer cut-off removing ability of the metal deposition layer are not damaged. In usual, the thickness of the adhesive layer is of 0.5 to 5 g/m$^2$, preferably, 1 to 3 g/m$^2$ in coated amount. In the case of less than 0.5 g/m$^2$, it is difficult to obtain a sufficient adhesive strength, and sensitivity degradation will be easily caused. On the other hand, in the case of more than 5 g/m$^2$, an excessive energy will be required to melt the adhesive layer and the layer cut-off performance will be lowered.

The formation of the peeling layer, the deposition anchor layer, the adhesive layer or the back surface layer may be performed by preparing a coating solution which is prepared by dispersing or dissolving a layer constituting material into a solvent such as organic solvent and then coating with the solution by a known coat method such as a gravure coat method, a gravure reverse coat method, a roll coat method, a knife coat method or the like. In the case where the wax is main component for the formation of the layer, a coating method such as hot melt coating or hot racker coating may be adopted.

According to the thermal transfer sheet of the first aspect of the present invention having the characters and structures described above, since the deposition anchor layer is formed by using the linear polymer having a glass transition temperature more than a specific temperature in an amount more than a constant amount, any hardening or setting process is not required and only the coating and drying processes are performed to obtain the layer having high heat resisting property. As a result, even if the layer is exposed to the high temperature of the thermal head, when the printed matter is obtained, any crack resulting in the loss of metallic luster of the metal deposition layer is not caused and the improved metallic luster can be realized. Thus, the printed matters having excellent metallic luster can be provided even if a printer using a thermal head is used.

Furthermore, although the thermal printer using the thermal head is most applicable to the thermal transfer sheet of the first aspect of the present invention mentioned above, this thermal transfer sheet will be used as a transfer foil for the conventional hot stamping method. Still furthermore, since the thermal transfer sheet of this aspect is excellent in the resolution, it is possible to print, as an aggregate of fine patterns such as the aggregate of dots, images of the letters and figures having metallic luster. Accordingly, it is possible to realize intermediate gradation by using the thermal transfer sheet of the first aspect in combination with so called area degradation method, as a concentration gradation display method, in which the area ratio of the dyed or colored portion per constant printed area is controlled by, for example, changing the dot size. Further, in the area degradation method, a screen patterning known in a printing field of such as pebling or brick pattern other than the dot pattern will be utilized. Particularly, in a case where the wax and thermoplastic resin used for the formation of the adhesive layer is contained in fine particle states, it is most suitable for the recording of the area degradation requiring high resolution.

EXPERIMENTAL EXAMPLE A

The thermal transfer sheet of the first aspect of the present invention will be described further in detail hereunder with reference to preferred examples and comparative examples, and in the following descriptions, the term "part(s)" and "ratio" are "weight part(s) and "weight ratio" if specific explanation is not applied.

Example A-1

A polyethylene terephthalate film having a thickness of 4.5 μm was prepared as a substrate material, and a back surface layer of a silicone modified polyester having a thickness of 0.5 g/m$^2$ (coated amount at dried time, the same being used hereinlater) was formed on one surface of the polyethylene terephthalate film through the coating process. Next, a peeling layer of carnauba wax having a thickness of 0.5 g/m$^2$ (coated amount) and a deposition anchor layer of a polyether sulfone as linear polymer having a thickness of 1 g/m$^2$ (coated amount) were formed in this order on another surface of the polyethylene terephthalate film by coating with following coating solutions. Furthermore, a metal deposition layer of aluminum having a thickness of 300 Å was formed on the deposition anchor layer through the vacuum deposition method. Thereafter, an adhesive layer having a thickness of 1 g/m$^2$ was formed on the metal deposition layer by coating with following coating solution, thus obtaining a thermal transfer sheet of the present invention.

Coating Solution for Peeling Layer

Water/isopropyl alcohol (1/1) was used as a solvent and carnauba wax of 40 weight % (solid component) emulsion was prepared.

Coating Solution for Deposition Anchor Layer

Polyether sulfone: 10 parts

Dimethyl formamide (DMF): 90 parts

Coating Solution for Adhesive Layer 25 weight % (solid component) emulsion of ethylene-acrylic acid copolymer in water/isopropyl alcohol (1/1) and 40 weight % (solid component) emulsion of carnauba wax in water/isopropyl alcohol (1/1) are mixed with each other in a volume ratio of 1:2 to prepare the coating solution for the adhesive layer.

Example A-2

A thermal transfer sheet was obtained by substantially the same manner as that of the Example A-1 except that there was used the following coating solution containing polyetherether ketone (PEEK) as linear polymer for forming a deposition anchor layer (1 g/m$^2$).

Coating Solution for Deposition Anchor Layer

Polyetherether ketone (PEEK): 5 parts

N-methylpyrolidone (NMP): 95 parts

Example A-3

A thermal transfer sheet was obtained by substantially the same manner as that of the Example A-1 except that there was used the following coating solution containing polyimide, which does not need the hardening process, as linear polymer for forming a deposition anchor layer (1 g/m$^2$).

Coating Solution for Deposition Anchor Layer

Polyimide: 10 parts

N-methylpyrolidone (NMP): 90 parts

Example A-4

A thermal transfer sheet was obtained by substantially the same manner as that of the Example A-1 except that there was used the following coating solution containing polyamideimide, which does not need the hardening process, as linear polymer as a material for forming a deposition anchor layer (1 $g/m^2$).

Coating Solution for Deposition Anchor Layer

Polyamideimide: 10 parts

Dimethyl formamide (DMF): 90 parts

Example A-5

A thermal transfer sheet was obtained by substantially the same manner as that of the Example A-4 except that there was used the following coating solution prepared by adding an acrylic resin to a polyamideimide modified product as linear polymer for forming a deposition anchor layer (1 $g/m^2$).

Coating Solution for Deposition Anchor Layer

Polyamideimide modified product: 50 parts (10% solution of toluene:ethanol=1:1)

Acrylic resin: 50 parts (10% solution of toluene:ethanol=1:1)

Example A-6

A thermal transfer sheet was obtained by the manner substantially the same as that of the Example A-5 except that the peeling layer was not formed and a coating solution for a deposition anchor layer (polyamideimide modified product:acrylic resin=95:5) was used.

Comparative Example A-1

A thermal transfer sheet was obtained in substantially the same manner as that of the Example A-1 except that the following coating solution for forming a deposition anchor layer (1 $g/m^2$) was used.

Coating Solution for Deposition Anchor Layer

Nitrocellulose: 20 parts

Ethyl acetate: 80 parts

Comparative Example A-2

A thermal transfer sheet was obtained in substantially the same manner as that of the Example A-1 except that the following coating solution for forming a deposition anchor layer (1 $g/m^2$) was used.

Coating Solution for Deposition Anchor Layer

Saturated polyester resin: 20 parts

Methylethylketone: 40 parts

Toluene: 40 parts

Comparative Example A-3

A thermal transfer sheet was obtained in substantially the same manner as that of the Example A-1 except that the following coating solution for forming a deposition anchor layer (1 $g/m^2$) containing an acrylic resin used in the Example A-5 in substitution for the linear polymer was used.

Coating Solution for Deposition Anchor Layer

Acrylic resin: 20 parts

Methylethylketone: 40 parts

Toluene: 40 parts

Comparative Example A-4

A thermal transfer sheet was obtained by the manner substantially the same as that of the Example A-5 except that a coating solution for a deposition anchor layer (polyamideimide modified product:acrylic resin=30:70)

Coating Solution for Deposition Anchor Layer

Polyamideimide modified product: 30 parts (10% solution of toluene:ethanol=1:1)

Acrylic resin: 70 parts (10% solution of toluene:ethanol=1:1)

[Experiments and Results]

Evaluations in performances of the thermal transfer sheets obtained by the above Examples of the present invention and the Comparative Examples were made by using cast coat papers as transfer-receiving material and a 200 dpi line-type head (manufactured by KYO-SERA Co., Ltd.) as a thermal head. Test methods and evaluation references of the respective evaluation items are as follows. The evaluation results are shown in Table 1.

Mirror Surface Luster Feeling After Printing

Observation was performed after printing to confirm occurrence of cloudiness (loss of metallic luster) of a printed surface, the printing operation being carried out by applying energy of 0.5 mJ/dot in a case of high energy printing and of 0.2 mJ/dot in a case of low energy printing.

In the Table 1, the respective symbols represent:

○: no occurrence of cloudiness on a printed surface in a solid printing

Δ: occurrence of partial cloudiness

×: occurrence of cloudiness on almost or all the surface

Resolution

The sharpness at the edge portions of the printed matters were examined and represented as:

○: providing excellent sharpness.

Δ: providing slightly degraded sharpness

×: providing degraded sharpness

TABLE 1

| Example No. | Glass Transition Temperature | Mirror-like Luster surface feeling: Low Energy Printing | Mirror-like Luster surface feeling: High Energy Printing | Resolution |
|---|---|---|---|---|
| Example A-1 | 220 | ○ | ○ | ○ |
| Example A-2 | 143 | ○ | Δ | ○ |
| Example A-3 | 250 | ○ | ○ | ○ |
| Example A-4 | 230 | ○ | ○ | ○ |
| Example A-5 | 230/105 | ○ | Δ | ○ |
| Example A-6 | 230/105 | ○ | ○ | ○ |
| Comparative Example A-1 | 63 | x | x | x |
| Comparative Example A-2 | 72 | x | x | x |
| Comparative Example A-3 | 105 | x | x | x |
| Comparative Example A-4 | 230/105 | x | x | x |

The following matters will be confirmed from the above Table 1. In the case where the linear polymer having the glass transition temperature of more than 130° C. was used by an amount of more than 40 wt % as the basic resin of the deposition anchor layer, the luster feeling of the mirror surface provided a good appearance. Particularly, in the Examples 1, 3 and 4 in which the linear polymers having the glass transition temperatures of more than 200° C. are used solely, the luster feeling provided good appearance even in the high energy printing. Furthermore, even in the case where the thermoplastic resin having the glass transition temperature of less than 130° C. was used in combination of the linear polymer having the glass transition temperature of more than 200° C., when the linear polymer of an amount of more than 40 wt % was used, as shown in the Examples 5 and 6, a good result was achieved. For example, in the Example 5, the linear polymer is contained by an amount of more than 50 wt %. On the contrary, in the case of the linear polymer in an amount of less than 40 wt % such as 30 wt % in the Comparative Example 4, the metallic luster was lost even in the low energy printing. Moreover, in the case of using a sole thermoplastic resin (linear polymer) having the glass transition temperature of less than 130° C., as in the Comparative Examples 1 to 3, the metallic luster was lost even in the the low energy printing and a good metallic luster could not obtained.

A thermal transfer sheet according to the second aspect of the present invention will be described hereunder with reference to the accompanying drawing. The thermal transfer sheet of this second aspect has substantially the same laminated structure as that of the first aspect mentioned above. Thus, in this meaning, FIG. 1 also represents the sectional view of the second aspect as well as the first aspect. Therefore, the thermal transfer sheet of the second aspect also essentially comprises the substrate 2, the deposition anchor layer 4, the metal deposition layer 5 and the adhesive layer 6, and the back surface layer 7 and the peeling (peelable) layer 3 may be eliminated as occasion demands. In the second aspect, the thermal transfer sheet is in general used in form of a thermal transfer ribbon having a continuous belt-like shape, but it may be used as a single unit sheet.

The substrate 2 in the second aspect will be formed of the same material as that of the first aspect. The back surface layer 7, the peeling layer 2 and the metal deposition layer 5 will be also formed of the same materials as those of the first aspect in substantially the same manner as that mentioned with respect to the first aspect.

Although it is desired that the deposition anchor layer 4 is formed of the material similar to that of the first aspect, the material is not specifically limited as far as the deposition anchor layer 4 attains the function as the deposition anchor layer. Therefore, there will be listed up, for example, as a material for forming the deposition anchor layer, thermosetting resin such as alkyd resin, phenolic resin, polyimide resin, epoxy resin, urethane resin, or unsaturated polyester resin. There may be also used thermosetting resin, for example, olefin group resin such as polyethylene or polypropylene, acrylic group resin such as polymethylmethacrylate or polyacrylamide, styrene group resin such as polystyrene, vinyl group resin such as polyvinyl chloride or polyvinyl acetate, polyether group resin such as polyoxymethylene or polyphenyleneoxide, polyvinylbutyral resin, nitrocellulose resin, or ethylcellulose resin.

In the case where the resin other than that used for the first aspect of the present invention is used, the deposition anchor layer can be formed by substantially the same manner as that of the first aspect mentioned before. Accordingly, the thickness of the deposition anchor layer is usually in a range of 0.1 to 20 g/m$^2$ in the coated amount, and as occasion demands, a coloring agent may be mixed with the deposition anchor layer.

In the case where the deposition anchor layer is formed so as to further provide a function of the peeling layer, an independent peeling layer 3 may be eliminated. In such case, when a wax group material is added to the deposition anchor layer 4, the heat resisting property thereof is made short at the deposition time, it will be better to use resins, mentioned above as the deposition anchor layer material, each having relatively low molecular weight and low cohesive strength in view of the heat resisting property, the releasing ability to the substrate, adhesive property to the metal deposition layer, the layer cut-off performance at the printing time, etc.

In the second aspect, the adhesive layer 6 will be referred to as a specific layer. The material composition of the adhesive layer 6 is not uniform along the direction of the thickness thereof. Although the adhesive layer is composed of at least a wax component and a thermoplastic resin component as an entire structure thereof, in the adhesive layer of the second aspect, the ratio of the resin component with respect to the wax component is made small, along the thickness direction thereof, on the side to be faced to a transfer-receiving material (that is, adhesive layer surface side of the thermal transfer sheet) with respect to the opposite side (that is, metal deposition layer side of the thermal transfer sheet). In other words, the resin composition ratio on the front, i.e. outer, surface side of the adhesive layer is made smaller than that on the inner surface side thereof. The reference or standard for prescribing such ratio may be based on weight or volume as far as it is unified in use. Further, the wording "along the direction of the thickness of the adhesive layer" means that the ratio of an intermediate portion between the outer surface side and the inner surface side of the adhesive layer is an intermediate ratio of the outer surface side ratio and the inner surface side ratio, and means that the ratio is not larger than that of the inner surface side and not smaller than that of the outer surface side. Further, there may be adopted a case where the composition ratio is not changed with smooth inclination from the inner surface side to the outer surface side of the adhesive layer and is changed in a staged manner.

If there exists a difference in level due to the presence of an ink layer or the like of an image preliminarily printed on the transfer-receiving material or the transfer-receiving material itself provides protruded and recessed surface portions due to its coarse, i.e. irregular, surface condition, such difference in level or protruded and recessed surface conditions of the base material may appear on the metallic luster surface at the transferring time of the metal deposition layer because of metallic feeling such as metallic luster or mirror-like reflection. On the other hand, as mentioned above, if the ratio of the thermoplastic resin component in the adhesive layer with respect to the wax component ratio is made small on the transfer-receiving material side with respect to the metal deposition layer side along the thickness direction of the adhesive layer, since the wax component is much on the side of the adhesive layer contacting the transfer-receiving material, the permeability of the ink to the transfer-receiving material under the heating condition in the printing process becomes good and, therefore, the protruded and recessed portions of the transfer-receiving material surface can be embedded with the ink. Accordingly, even if the metal deposition layer is transferred to the transfer-receiving material surface having difference in level or irregular surface condition, such difference in level or irregularity cannot clearly appear.

Furthermore, since the inner surface side of the adhesive layer riches in the thermoplastic resin component compared with the outer surface side thereof, the lowering of the cohesive strength due to the wax component can be suppressed, and accordingly, a desired cohesive strength as the adhesive layer can be realized and the fixing property (adhesive property to the transfer-receiving material) of the image printed can be improved. Moreover, since the adhesive layer is itself not formed only of the thermoplastic resin but formed of a mixture of the thermoplastic resin and the wax as an entire structure, a proper cohesive strength can be maintained. Accordingly, problems caused when the adhesive layer is formed only of the thermoplastic resin, for example, the excessive cohesive strength which results in the lowering of the printing sensitivity and the resolution, the lowering of Tg which results in the blocking and the degradation of the preservation of the printed matters, can be prevented. As the result, improved printing sensitivity, resolution and preservation performance can be achieved according to the adhesive layer of the second aspect of the present invention.

Particularly, it is preferred that the total content of the thermoplastic resin in the entire adhesive layer along the thickness direction thereof is within a range of 10 to 60 weight % with respect to the total weight of the adhesive layer. In the case of more than 60 weight %, there will be easily caused inconvenience in the printing sensitivity, the permeability to the transfer-receiving material and the blocking performance. On the other hand, in the case of less than 10 weight %, there may cause a case that the adhesive layer itself provides a poor cohesive strength and lacks in the proper fixing ability.

Substantially the same wax and thermoplastic resin materials as those mentioned with respect to the first aspect can be used for forming the adhesive layer 6 of this second embodiment. That is, various kinds of known waxes such as carnauba wax, paraffin wax, etc. will be used. As the thermoplastic resin for forming the adhesive layer, a resin which has a good compatibility to the wax and good adhesive property to the metal deposition layer will be used. Various kinds of ethylene group copolymers or their mixtures may be preferably used. It is desired that a copolymerization ratio of such ethylene group copolymer is decided such that the ethylene component is in the range of 50 to 95 with respect to the total weight of the copolymer being 100, and that the ethylene group copolymer has an weight-average molecular weight (Mw) in the range of 1000 to 10000. When a plurality of copolymers are used in mixture, it is desired that each of the respective copolymers has the weight-average molecular weight in the above range. There may also be used known thermoplastic resins, other than the above described ethylene group copolymer, such as polyethylene resin or polypropylene resin usable as adhesive layers of other thermal transfer sheets solely or in combination with the ethylene group copolymer. Furthermore, it is particularly preferred that a material such as ethylene group thermoplastic resin or wax is contained in the adhesive layer in fine particle states having average diameter of 10 $\mu$m or less than 10 $\mu$m.

The adhesive layer, in which the composition ratio of the thermoplastic resin along the direction of the thickness thereof is made smaller on the transfer-receiving material side of the adhesive layer than that on the metal deposition layer side, will be formed in the following manner.

For example, more than two kinds of coating solutions having different composition ratio of the thermoplastic resin to the wax are prepared and these coating solutions are subsequently coated on the metal deposition layer to thereby form an adhesive layer having a desired distribution of the composition ratio. In such case, if there is adopted a coating method in which first solution is dried and solidified and then the next solution is applied and dried, an adhesive layer having a multi-layer structure can be obtained though different in coating solvents to be used. In such multi-layer structure, although the resin composition ratio changes in staged manner in the thickness direction of the adhesive layer, the inclination of the resin composition ratio can be realized between the respective layers of the coating solutions, if a coating solution to be applied on an already-dried and -solidified lower layer is prepared with the use of a solvent capable of dissolving the solidified lower layer by some extent. At any rate, even if an adhesive layer having such multi-layer structure is formed, a desired effect can be expected according to the second aspect of the present invention.

Further, according to a method in which a first coating solution is applied and a next coating solution is then applied in the state that the first coated solution has not been dried, an adhesive layer having an inclination of the resin composition ratio will be formed without providing a clear multi-layer structure. Furthermore, in the use of a multi-layer curtain coater, since it is possible to apply the coating solutions so as to provide a multi-layer structure in a wet state, an adhesive layer having more smooth inclination, having no staged portion, of the resin composition ratio can be formed by adjusting the drying temperature and drying time after the applying.

However, for the adhesive layer of the present invention, it is not a matter of significant for the performance thereof whether the resin composition ratio along the thickness direction thereof provides a staged configuration or smooth inclination, and both the structures will be well adopted.

As the coating solution for forming the adhesive layer, there may be used an aqueous emulsion or aqueous dispersion prepared by dispersing, in particle state, wax and thermoplastic resin as a constituent materials of an adhesive into an aqueous solvent. When such coating solution is applied on the metal deposition layer, an obtainable adhesive layer has a structure in which the wax and the thermoplastic resin are not uniformly compatible and they are disposed in separated particle states. According to this structure, the layer cut-off performance of the adhesive layer is not damaged even if the adhesive layer is formed to have a relatively large thickness and the resolution can be further improved.

According to the present invention, the formation of the adhesive layer through the coating process mentioned above is not limited to a specific one as far as the multi-layer coating process can be done. For example, the adhesive layer is formed by a known coating method such as gravure coat, a gravure reverse coat, roll coat, knife coat, curtain coat, etc. In a case where a heating treatment is required, it will be carried out at an optional temperature and for an optional time interval after the coating process.

Although the required thickness of the adhesive layer is different in view of surface irregularity of the transfer-receiving material, it is preferred to make thin the thickness thereof in the viewpoints of the printing sensitivity, the fixing performance of the printed image and the resolution as far as the metallic luster and the layer cut-off property of the metal deposition layer are not damaged, and in usual, the required thickness is 0.5 to 5 $g/m^2$ in coated amount, preferably, 1 to 3 $g/m^2$. In the case of less than 0.5 $g/m^2$, it is difficult to provide a sufficient adhesive strength and the sensitivity as the adhesive layer is damaged, and on the other hand, in the case of more than 5 $g/m^2$, more excessive energy is required for melting the adhesive layer and the layer cut-off property will be made worse.

According to the thermal transfer sheet formed according to the second aspect of the present invention as mentioned above, since the composition ratio of the adhesive layer formed of a mixture of the wax and the thermoplastic resin is made different along the thickness direction thereof such that the composition ratio of the thermoplastic resin is made small on the outer surface side of the adhesive layer, i.e. the side facing the transfer-receiving material, the metal feeling such as metallic luster of the metal deposition layer is not adversely affected by the irregularity of the base material and the improved preservation performance such as printing sensitivity, fixing ability and blocking performance even in the case where the metal deposition layer is transferred to the transfer-receiving material having no smooth surface condition or having an irregularity of the ink layer of the images already printed on the surface of the transfer-receiving material.

Although the thermal transfer sheet according to the second aspect mentioned above is most suitable for a thermal printer using the thermal head, the thermal transfer sheet can be used as a transfer foil for a conventional hot stamping method. Furthermore, since the thermal transfer sheet of this aspect has the superior resolution, it is possible to print the images such as letters or figures having metallic luster as aggregate of fine patterns such as dots. Accordingly, the intermediate concentration can be realized by utilizing, as a concentration gradation method, so-called an area degradation for representing the concentration gradation by controlling the area of the portion to be transferred per constant area by a method in which the dot size is changed. Further, in the area gradation method, a screen patterning known in a printing field of such as peblling or brick pattern other than the dot pattern will be utilized. particularly, in a case where the wax and the thermoplastic resin components used for the formation of the adhesive layer are contained in fine particle states, the obtainable thermal transfer sheet is most suitable for the recording of the area gradation requiring high resolution.

EXPERIMENTAL EXAMPLE B

The thermal transfer sheet of the second aspect of the present invention will be described further in detail hereunder with reference to preferred examples and comparative examples, and in the following descriptions, the term "part (s)" is a weight part(s) if specific explanation is not applied.

Example B-1

A polyethylene terephthalate film having a thickness of 9 μm was prepared as a substrate material, and a back surface layer of a silicone modified polyester having a thickness of 0.2 g/m$^2$ (coated amount at dried state, the same being used hereinlater) was formed on one surface of the polyethylene terephthalate film through the coating process. Next, a deposition anchor layer of a mixture of polyamideimide modified product and acrylic resin (weight ratio of 95:5) having a thickness of 0.5 g/m$^2$ was formed on another surface thereof through the coating processes with the use of the following coating solution.

Coating Solution for Deposition Anchor Layer

Polyamideimide modified product: 95 parts
(10% solution of toluene:ethanol=1:1)
Acrylic resin: 5 parts
(10% solution of toluene:ethanol=1:1)

Furthermore, a metal deposition layer of aluminum having a thickness of 300 Å was formed on the deposition anchor layer by the vacuum deposition method. Still furthermore, a coating solution for the adhesive layer having the following composition 1 was applied on the metal deposition layer through a gravure coat method so as to provide a thickness of 1 g/m$^2$ and then dried at a temperature of 70° C. to obtain a coated layer. Still furthermore, a coating solution for the adhesive layer having the following composition 2 was applied on the first coated layer through the gravure coat method so as to provide a thickness of 1 g/m$^2$ and then dried at a temperature of 70° C. to obtain a coated layer. These coated layers attain the function as the adhesive layer. Thus, the thermal transfer sheet according to the present invention was formed.

Coating Solution for Adhesive Layer (Composition 1)

Solid Component Base

Etylene-vinyl acetate copolymer emulsion: 63 parts
Polyester emulsion: 16 parts
Carnauba wax emulsion: 21 parts Coating Solution for Adhesive Layer (Composition 2)

Solid Component Base

Carnauba wax emulsion: 95 parts
Etylene-vinyl acetate copolymer emulsion: 5 parts

Example B-2

A thermal transfer sheet according to the present invention was formed by substantially the same manner as that of the Example B-1 except that the ethylene-acetate copolymer emulsion used for the Compositions 1 and 2 was substituted with ethylene-ethylacrylate copolymer emulsion.

Example B-3

A thermal transfer sheet according to the present invention was formed by substantially the same manner as that of the Example B-1 except that the ethylene-acetate copolymer emulsion used for the Compositions 1 and 2 was substituted with styrene-butadiene rubber emulsion.

Comparative Example B-1

A thermal transfer sheet was formed by the manner substantially the same as that of the Example B-1 except that the adhesive layer of the thermal transfer sheet was formed of a single layer of the Composition 1 so as to have a thickness of 2 g/m$^2$ in the dried state.

Comparative Example B-2

A thermal transfer sheet was formed by the manner substantially the same as that of the Example B-1 except that the adhesive layer of the thermal transfer sheet was formed by first coating the coating solution of the Composition 2 and then coating the coating solution of the Composition 1 on the first coated layer.

Comparative Example B-3

A thermal transfer sheet was formed by the manner substantially the same as that of the Example B-1 except that the adhesive layer of the thermal transfer sheet was formed of a single layer of the Composition 2 so as to have a thickness of 2 g/m$^2$ in the dried state.

[Experiments and Results]

Evaluations in performances of the thermal transfer sheets obtained by the above Examples of the present invention and the Comparative Examples were made by using, as a transfer-receiving material, mirror coat papers on which base figure patterns were preliminarily printed through an offset printing, and a 200 dpi line-type head (manufactured by KYO-SERA Co., Ltd.) as a thermal head. Test methods and evaluation references of the respective evaluation items are as follows. The evaluation results are shown in Table 2.

Printing Sensitivity (Transferred Quality)

Transferred quality of dots were evaluated as follows.

○: providing excellent transferred quality

Δ: providing slightly degraded quality

×: providing degraded quality

Resolution

Cut-off conditions of layers when printed matters are formed were evaluated in sharpness as follows.

○: providing excellent sharpness

Δ: providing slightly degraded sharpness

×: providing degraded sharpness

Fixing Ability

The fixing ability, i.e. adhesive performance, of the printed images were evaluated by printing images on a flat surface (a surface to which any image is not printed and a paper surface is exposed) and a boundary portion (providing a staged portion) between a printing portion and a not printing portion and bonding a cellophane tape to the formed images and thereafter peeing the same.

○: printed images were not transferred to the peeled tape.

Δ: printed images were slightly transferred to the peeled tape.

×: printed images were almost transferred to the peeled tape.

Preservation Quantity

A thermal transfer sheet was rolled up around a paper shell having one inch diameter and then reserved for two weeks under conditions of a temperature of 50° C. and a moisture of 85% RH, and thereafter, the blocking conditions were evaluated.

○: thermal transfer sheet could be used with no problem after the two week reservation.

×: thermal transfer sheet could not be used because of the blocking.

TABLE 2

| Example No. | Printing Sensitivity | Resolution | Fixing Ability: Printed Portion | Fixing Ability: Boundary Portion | Preservation Performance |
|---|---|---|---|---|---|
| Example B-1 | ○ | ○ | ○ | ○ | ○ |
| Example B-2 | ○ | ○ | ○ | ○ | ○ |
| Example B-3 | ○ | ○ | Δ | Δ | ○ |
| Comparative Example B-1 | x | x | ○ | x | x |
| Comparative Example B-2 | Δ | ○ | Δ | x | x |
| Comparative Example B-3 | ○ | ○ | x | x | ○ |

As can be seen from the Table 2, in the Examples B-1 to B-3, in which the adhesive layer was formed of a mixture of the wax and the thermoplastic resin and the ratio of the thermoplastic resin component with respect to the wax component was made smaller on the transfer-receiving material side of the adhesive layer than that on the metal deposition layer side thereof along the thickness direction of the adhesive layer, the excellent fixing performance could be realized. However, in the Comparative Example B-2, in which the resin composition ratio along the thickness direction of the adhesive layer was made reverse to those in the Examples B-1 to B-3, the inferior fixing performance was obtained and the product was not practical in use. Furthermore, even in a case where the same wax and thermoplastic resin were used, as seen from the Comparative Examples B-1 and B-3 in which the adhesive layer was composed of a single layer and the composition ratio of the thermoplastic resin has no inclination, the fixing and other performances were inferior to those of the Examples B-1 to B-3.

On the other hand, in the Examples B-1 to B-3, in which the composition ratio of the thermoplastic resin in the adhesive layer was specified along the thickness direction thereof, particularly, the Examples B-1 and B-2, in which ethylene group compound was used as the thermoplastic resin, provided more superior fixing and other performances.

What is claimed is:

1. A thermal transfer sheet for printing a printed matter having a metallic luster comprising a substrate, a deposition anchor layer, a metal deposition layer and an adhesive layer; said deposition anchor layer, said metal deposition layer and said adhesive layer being disposed in this order on one surface of said substrate, said adhesive layer being formed of a mixture comprising a wax and a thermoplastic resin, wherein, along a direction of thickness of the adhesive layer, a composition ratio of said thermoplastic resin to said wax is smaller, on a side of the adhesive layer which, when used will contact a transfer-receiving material, than on a side of the adhesive layer contacting the metal deposition layer.

2. A thermal transfer sheet according to claim 1, wherein a total amount of said thermoplastic resin in the adhesive layer is in a range of 10 to 60 weight % with respect to a total weight of said adhesive layer.

3. A thermal transfer sheet according to claim 1, wherein said adhesive layer contains, as the thermoplastic resin, at least one ethylene group copolymer.

4. A thermal transfer sheet according to claim 1, wherein said adhesive layer has a multi-layer structure having at least two adhesive layer components.

5. A thermal transfer sheet according to claim 1, wherein said wax and said thermoplastic resin are contained in said adhesive layer in fine particle states.

6. A thermal transfer sheet according to claim 1, wherein a coated amount of adhesive layer is in a range of 0.5 to 5 $g/m^2$.

7. A thermal transfer sheet according to claim 1, wherein a peeling layer is further disposed between said substrate and said deposition anchor layer.

8. A thermal transfer sheet according to claim 1, wherein a back surface layer is further disposed on another surface of said substrate.

9. A thermal transfer sheet according to claim 1, wherein said deposition anchor layer contains a linear polymer having a glass transition temperature of not less than 130° C. by an amount of not less than 40 weight % with respect to a total weight of said deposition anchor layer.

* * * * *